United States Patent

Herrmann

[11] 3,847,411
[45] Nov. 12, 1974

[54] VEHICLE ACCIDENT PROTECTION SYSTEM AND METHOD OF PROTECTING PASSENGERS

[75] Inventor: Gunter Herrmann, Ottobrunn-Riemerling, Germany

[73] Assignee: Messerschmitt-Bolkow-Blohm Gesellschaft Mit Beschrankter Haftung, Munich, Germany

[22] Filed: Mar. 21, 1972

[21] Appl. No.: 236,711

[30] Foreign Application Priority Data
Mar. 30, 1971 Germany............................ 2115302

[52] U.S. Cl. ............ 280/150 AB, 180/103, 137/48, 280/87 R, 417/76
[51] Int. Cl. ............................................ B60r 21/08
[58] Field of Search......... 280/150 AB; 244/122 AF

[56] References Cited
UNITED STATES PATENTS
3,632,133  1/1972  Haas............................. 280/150 AB
3,692,495  9/1972  Schneiter et al. ............ 280/150 AB
3,694,003  9/1972  Radke........................... 280/150 AB Primary Examiner—David Schonberg
Assistant Examiner—John P. Silverstrim
Attorney, Agent, or Firm—McGlew and Tuttle

[57] ABSTRACT

A vehicle having a shock absorption system for protecting passengers in an accident includes an inflatable bag or casing which is filled by a pressure fluid whenever an accident sensing device such as an inertial detecting element indicates that an accident is likely to take place. At the same time, the inventive method and apparatus includes means for reducing the pressure within the passenger space of the vehicle in order that the effects to the passenger of the sound pressure which is created by the inflation of the casing is counteracted. Both the pressure for inflating the casing and the source for pumping the passenger compartment so as to reduce its pressure is advantageously obtained from the ignition of a solid charge.

9 Claims, 5 Drawing Figures

VEHICLE ACCIDENT PROTECTION SYSTEM AND METHOD OF PROTECTING PASSENGERS

BACKGROUND OF THE INVENTION

1. Field of the invention

This invention relates in general to a device and method for protecting passengers in vehicles and, in particular, to a new and useful method and apparatus for inflating a protective casing to support and hold a passenger against being hurled against a portion of a vehicle and to means for also reducing the pressure within the passenger compartment.

2. Description of the prior art

The invention deals with the protection of passengers in vehicles, especially passenger cars having shock absorption systems which include a inflatable casing or bag located in the passenger compartment which is inflated by a fluid pressure source when actuated by a detecting device which senses when an accident condition of the vehicle has been assumed. The sensing devices are well known devices which detect such things as the rapid deceleration of the vehicle and the closeness of an adjacent vehicle, etc., and these sensing devices have been used to initiate the inflation of the casing from the gas or vapor source as soon as the accident condition is detected.

It is well known that when a vehicle collides with a stationary or moving obstacle, each passenger is thrown within an average of 50 milliseconds or less against any object located in the direction of motion, for example, the steering wheel, dashboard, windshield, the back of the front seat, etc. It can be evidenced daily that in the case of medium travelling speeds, this can lead to serious, frequently even fatal injuries, unless the vehicle involved in the collision is furnished with one or several shock absorption systems for holding the passengers so that they will not be thrown into a part of the automobile. While an inflatable casing arranged in the automobile for immediate inflation prior to the impact of a collision will reduce injuries to passengers resulting from such collisions to a minimum when appropriately arranged inside of the passenger compartment of the vehicle and provided the gas or vapor source operates in conjunction with the accident sensing device to complete the inflation process in time. Even with such an inflatable shock absorber, there is still a possibility of secondary injuries due to the sound pressure which is brought about by the rapid inflation of the casing.

SUMMARY OF THE INVENTION

In accordance with the invention, there is provided a method and apparatus for ensuring the safe operation of an inflatable casing to hold a passenger against injury and to also eliminate the sound pressure dangers which are present because of the rapid inflation of such devices. In accordance with the invention, this is achieved by generating an underpressure compatible with the passenger's organisms inside of the passenger compartment at the same time that the casing is inflated. In a preferred arrangement of the invention, this is effected by providing a jet pump in the passenger space for evacuating the air inside thereof in order to produce a reduction of the sound pressure when the shock absorbing casing is inflated so that it has no detrimental effect on the health of the passengers. A single jet pump may be used in the pressure space to produce an underpressure therein and this can be operated either with a gas or vapor supplied by a special source provided for this purpose or with a gas or vapor which is used for inflating the casing. In the latter case, a simplification of the construction results. In both cases, it is expedient to use a solid rocket booster with at least one charge based on high speed combustion to serve as the gas source. Such an arrangement has many advantages over the known gas or vapor filled high pressure containers or bottles which are used for such purposes. The known high pressure containers or bottles are a disadvantage because they place the passenger into the additional jeopardy of an explosion of such a bottle at any time and also, they are subject to losses of pressure when standing for long times. This is particularly important for use in inflating a casing to sustain a passenger in an accident because of the statistically relatively long time interval between two collision accidents involving the same vehicle.

An additional feature of the use of a solid rocket booster for generating the gas pressure needed for inflating the inflatable casing and also for evacuating the compartment, is that it is capable of generating a high pressure within the extremely short time period between when an accident condition is sensed or the beginning of an accident and the ensuing movement of the passengers relative to the vehicle. The system of the invention provides means for supplying the pressure gas to the inflatable casing immediately and also effectively cooled due to the expansion of the gas in the engine nozzles. This cooling effect can easily be intensified by locating solid coolants in the flow path of the gas. This arrangement has a great advantage particularly when one and the same solid rocket booster is coordinated with both the jet pump and the inflatable casing of the shock absorption system since the casing can burst in the case of thermal overloads.

Accordingly, it is an object of the invention to provide an improved method of protecting a passenger in a vehicle against impact after a collision using an inflatable body sustaining bag which comprises sensing when an accident condition has arisen and directing a fluid under pressure into the bag to inflate it rapidly while simultaneously reducing the pressure in the passenger compartment.

A further object of the invention is to provide an apparatus for use in a vehicle for transporting persons which have a shock absorption system and which comprises at least one inflatable casing, means for sensing an accident condition, means responsive to the sensing means for inflating the casing, and means responsive to the sensing means for reducing the pressure in the passenger compartment at the same time.

A further object of the invention is to provide a safety device which comprises a steering wheel having a central compartment defining an inflatable casing receiving compartment, and an ignitable charge contained in said compartment communicating with the interior of said casing, and means responsive to the sensing of an accident condition which ignites an ignitable charge to immediately inflate said casing.

A further object of the invention is to provide an apparatus which includes an inflatable casing with an explosive charge connected to said casing for inflating said casing and means for supplying gas generated by said explosive charge to a jet pump for evacuating a passenger compartment.

A further object of the invention is to provide a safety device for a vehicle which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
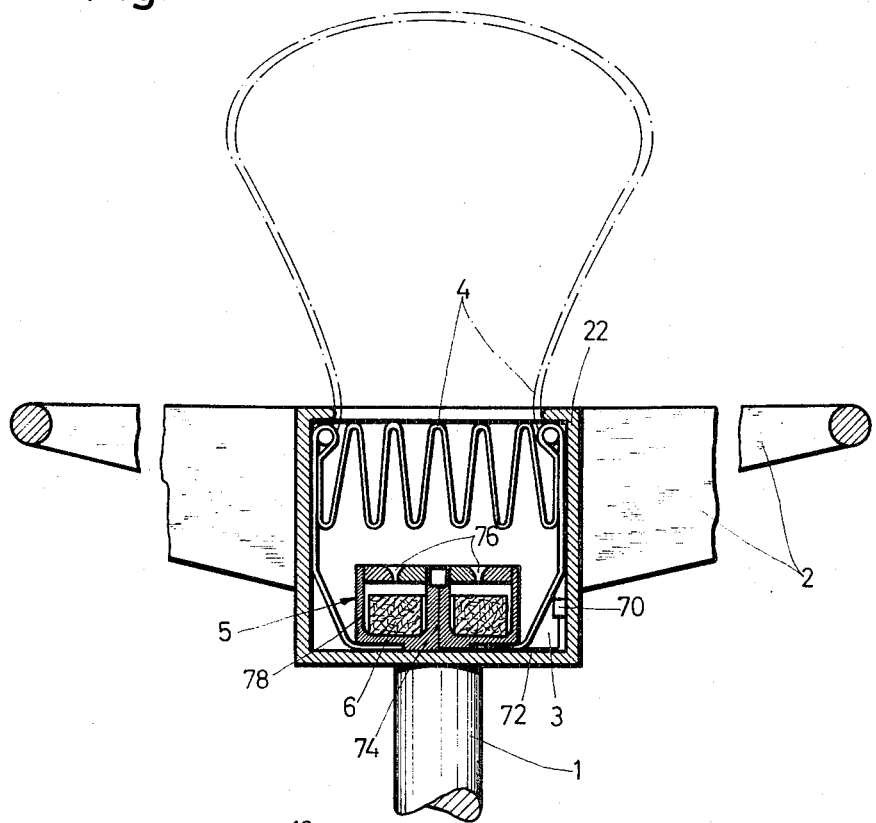
FIG. 1 is an axial sectional view of a steering wheel of a passenger car constructed in accordance with the invention.

Referring to the drawings in particular, the invention embodied therein as shown in FIG. 1 comprises, a safety device for a vehicle which includes a steering column 1 having a steering wheel 2 with a central portion 2a defining a hollow space 3 which accommodates a shock absorbing system. The shock absorbing system includes an inflatable folded casing 4, a high pressure fluid source or gas pressure generator, generally designated 5, and accident sensing means 70 which is connected through a cable 72 to ignition means 74 for igniting an explosive charge 6 in order to instantly produce high pressure gases. The high pressure gases which are generaed by the charge 6 are directed through nozzles 76 at the inside of the inflatable casing 4 to cause it to expand outwardly from the folded position indicated in solid lines to the dotted line position indicated. The means for generating the high pressure fluid in the form of the gas pressure generator 5 may comprise the solid rocket booster 76 which includes the charge 6 therein and which is of an ignitable explosive charge material which has a high speed of combustion.

Figure 2:
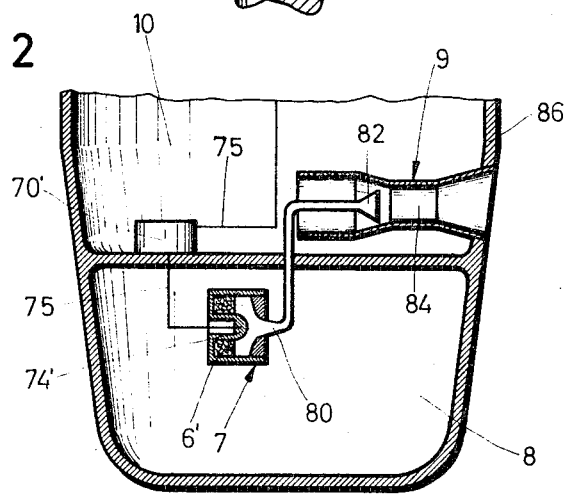
FIG. 2 is a partial horizontal sectional view of the rear portion of a passenger space in a motor vehicle constructed in accordance with the invention.

As shown in FIG. 2, the vehicle containing the steering column 1 is provided with a high pressure fluid generator, generally designated 7, in the form of a similar rocket booster with a solid charge 6' which is adapted to be located in the trunk space 8 of the same car shown in FIG. 1. The gases which are generated flow through a duct 80 which terminates in a discharge 82 at the Venturi section or throat 84 of an air evacuating pump or jet pump, generally designated 9. The pump 9 is arranged in a wall 86 of the vehicle in a position to evacuate the passenger compartment 10 to subsequently create an underpressure therein in order to prevent the formation of a sound pressure within the passenger space upon inflation of the casing 4 which would be detrimental to the passengers' health.

A sensing device 70' is used for actuating igniter 74' or the device 70 of FIG. 1 is connected by cable 75 to igniter 74' for this purpose.

Figure 3:
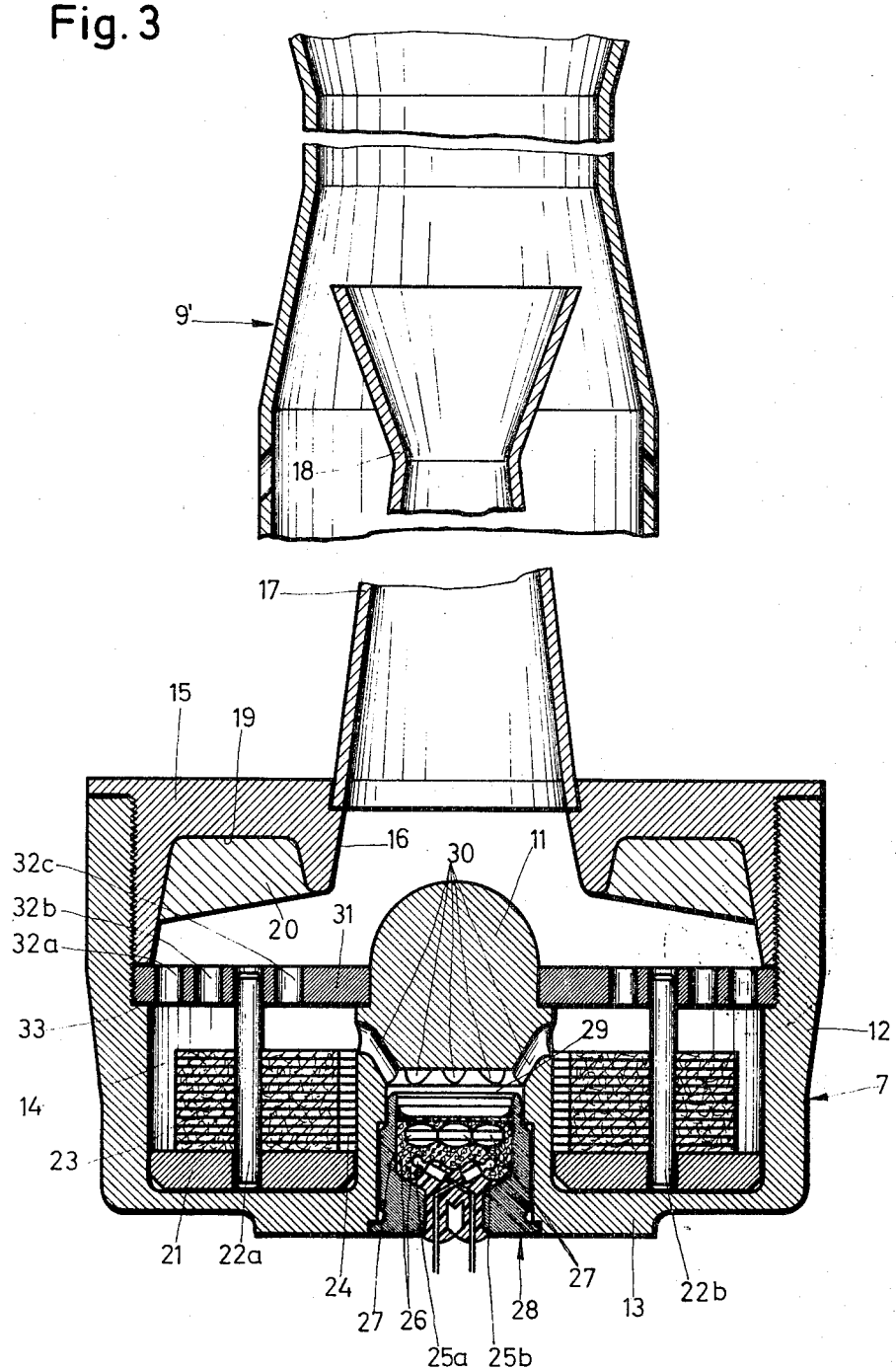
FIG. 3 is an enlarged exploded sectional view of an arrangement of a rocket booster with a jet pump similar to FIG. 2.

FIG. 3 is a slightly modified enlargement of a rocket booster powered jet pump which may be employed either for evacuating the passenger compartment or for inflating the casing 4 or for both. The rocket booster 7 includes a symmetrical housing or jacket 12 in which there is provided a centrally located core 11 which extends upwardly from a base 13 leaving an annular chamber or space 14 within the jacket 12. The annular space is closed by a ring 15 which forms the inner end of a nozzle 16. The nozzle 16 is connected with a conically tapered conduit 17 having a drive nozzle portion 18 in a jet pump 9'. An interior annular groove 19 is formed on the ring 15 and it is filled with a solid coolant material 20.

An annular charge 23 of an ignitable material having a high speed of combustion is supported on an annular plate 21 arranged in the chamber 14. The charge 23 is secured against rotation by means of two locking pins 22a and 22b which extend between plate 21 and a distributor plate 31. The charge 23 may be in the form of a burled disc charge comprising a powder foil of a type D 470, V 172, or the like. The burled disc charge 23 is ignited at its inner surface 24 by means of an ignition system, generally designated 28.

The ignition system 28 comprises an electric bridge igniter with two electric pellets 25a and 25b, a primary granular charge 26 and a secondary pellet charge 27. The ignition system is accommodated within an installation extension 29 of the housing core 11. The core 11 is provided with overload bores 30 which lead from the ignition system to the inner surface 24 of the disc charge 23. The distributor plate 31 carries bores 32a, 32b, and 32c which are loacated on three separate concentric partial circles and they provide passages which permit passage of the gases generated from the disc charge 23 and which ensure that the gases flow into contact with a solid coolant 20 as they move toward the nozzle 16. The distributor plate 31 also provides a carrier for a damming wall 33 which comprises a material such as aluminum foil, nitro-film material or the like.

Figure 4:
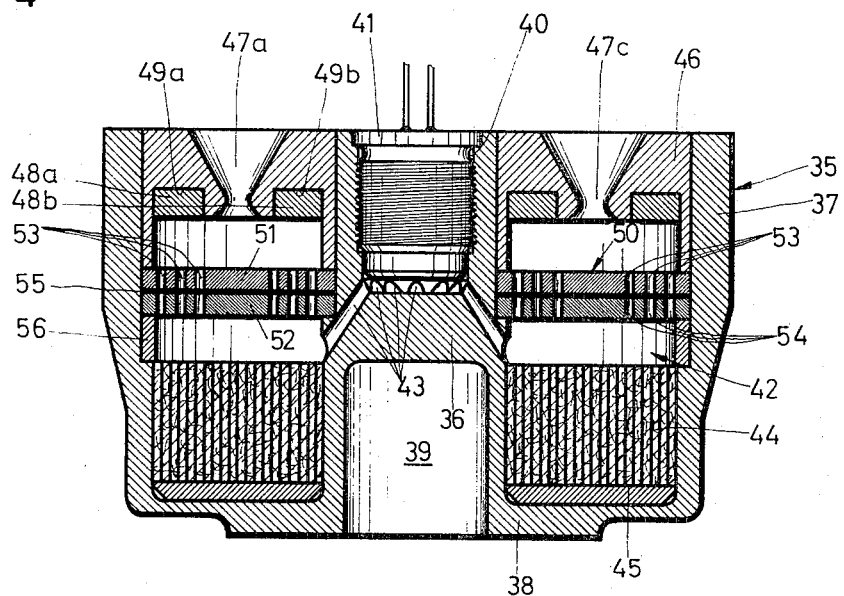
FIG. 4 is a transverse sectional view of another embodiment of solid rocket booster for use in operating two jet pumps and two shock absorbing casings at the same time.
Figure 5:
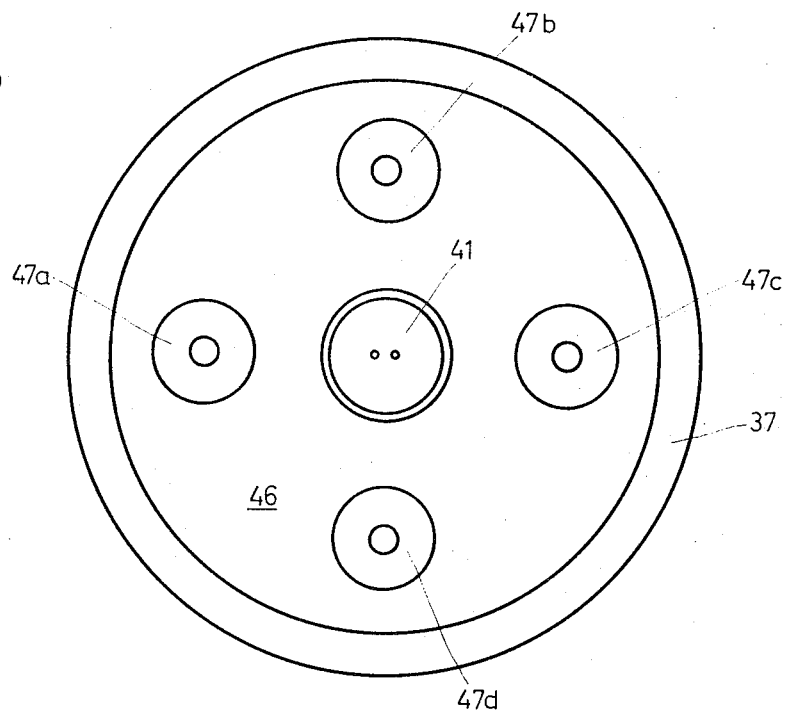
FIG. 5 is a top plan view of the embodiment shown in FIG. 4.

In the embodiment shown in FIGS. 4 and 5, a solid rocket booster, generally designated 35, is constructed similar to the booster designated 7' in FIG. 3, but it is capable of providing gases under pressure for operating several pumps or several inflatable bags. The solid rocket booster 35 includes a housing or jacket 37 with a central recess 39 in a base 38 which defines a raised boss 36 which is centrally located within the housing 37. The boss 36 is provided with a top hollowed interior defining an installation area 40 for the accommodation of an ignition system 41 of a type described in respect to FIG. 3. Overload bores 43 lead from the installation area 40 of the ignition system 41 to the combustion chamber 42. The bores 43 end at the nozzle side front surface of a charge 44 which comprises a burled helical coil charge of a material having a rapid combustion characteristic. The coil charge 44 is supported on a plate 45. A nozzle ring 46 is located at the top of the combustion chamber 42 and it is provided with separate nozzle discharges 47a, 47b, 47c and 47d which lead into the combustion chamber 42 above distributor plates 51 and 52. The interior upper portion of the chamber is filled with the solid coolant 48a and 48b arranged within annular grooves 49a and 49b, respectively. A damming carrier 50 comprises the two distributor plates 51 and 52 which has a plurality of bores 53 and 54 located opposite to the solid coolant 48a and 48b. The bores 53 and 54 guide the gases which are produced during an accident emergency by the burled helical coil charge 44. The gases are moved past the solid coolant 48a and 48b, and at the same time, they move together for exit through the respective nozzles 47a, 47b, 47c and 47d which are arranged at evenly spaced locations around the circumference of the ring. Two of the nozzles 47a and 47c are coordinated with an inflatable casin of the type described in FIG. 1, whereas the two others 47b and 47d are each coordinated with a jet pump of the type described in FIG. 2. The damming which is designated 55 may be made of a nitro-film material and is located between the two distributor plates 51 and 52 and form together with them a structural unit. On the charge side of the damming carrier 50, a spacer 56 is provided which due to its dimension and location inside of the combustion chamber 42 ensures that the helical coil charge 44 and the damming carrier 50 are spaced in such a way that the latter cannot impede the ignition of the helical coil charge 44 at the front side facing the nozzle.

While specific embodiments of the invention have been shown and described in detail to illustrate the application of the principles of the invention, it will be understood that the invention may be embodied otherwise without departing from such principles.

What is claimed is:

1. A vehicle for the transportation of persons particularly automobiles having a shock-absorption system, comprising at least one inflatable casing adapted to be installed in the passenger compartment of the automobile, fluid-pressure means, means for sensing an accident condition of the automobile connected between said casing and said fluid-pressure means for initiating the inflation of said casing by means of said fluid-pressure, and pump means having a suction in the passenger compartment and a discharge connected to atmosphere and being connected to said sensing means and said fluid-pressure means and being actionable thereby to produce an underpressure in the passenger compartment at the same time as said casing is inflated.

2. A vehicle, according to claim 1, wherein said pump means comprises a jet pump connected into said passenger compartment.

3. A vehicle, according to claim 2, wherein said jet pump includes a passenger compartment air evacuation conduit and a high-pressure fluid conduit connected into said passenger compartment evacuation conduit, said fluid-pressure means comprising means for generating a high-pressure fluid connected to said high-pressure fluid conduit.

4. A vehicle, according to claim 1, wherein said fluid-pressure means comprises a rocket booster for generating high-pressure gases, said pump means being operated by said high-pressure gases.

5. A vehicle, according to claim 1, wherein said fluid-pressure means comprises a rocket booster comprising at least one charge of an ignitable material having a high speed combustion rate for generating said pressure-fluid source.

6. A vehicle, according to claim 5, including means for cooling said generated gases comprising a solid coolant.

7. A method of providing protection to a passenger in a vehicle having a passenger compartment with an inflatable casing which is inflatable by fluid-pressure to support the individual and hold him so that he does not crash against any vehicle part, comprising inflating the casing when an accident condition is sensed and simultaneously pumping air out of the vehicle passenger compartment to the exterior of the vehicle to reduce the pressure in the vehicle to counteract the generation of sound pressure by the inflation of said casing.

8. A method, according to claim 7, including igniting a booster charge to generate high-pressure gases and using the gases to inflate the casing.

9. A method, according to claim 8, including using a jet pump to evacuate the passenger compartment in order to reduce the pressure in the vehicle and using the gases which have been generated by the ignition of said charge to operate said jet pump.

* * * * *